United States Patent [19]

Jing et al.

[11] Patent Number: 5,681,881
[45] Date of Patent: Oct. 28, 1997

[54] FLUOROELASTOMER COMPOSITIONS

[75] Inventors: Naiyong Jing, Woodbury; Robert E. Kolb, Afton; Miguel A. Guerra, Woodbury, all of Minn.

[73] Assignee: Minnesota Mining and Manufacturing Company, St. Paul, Minn.

[21] Appl. No.: 653,526

[22] Filed: May 24, 1996

[51] Int. Cl.$^6$ ............................................. C08K 5/00
[52] U.S. Cl. ............................................. 524/368; 524/366
[58] Field of Search ............................... 524/366, 368

[56] References Cited

U.S. PATENT DOCUMENTS

| | | | |
|---|---|---|---|
| 2,968,649 | 1/1961 | Pailthorp et al. | 260/80.5 |
| 3,051,677 | 8/1962 | Rexford | 260/29.6 |
| 3,125,599 | 3/1964 | Warnell | 260/535 |
| 3,159,609 | 12/1964 | Harris et al. | 260/87.5 |
| 3,250,807 | 5/1966 | Fritz et al. | 260/535 |
| 3,318,854 | 5/1967 | Honn et al. | 260/87.7 |
| 3,392,097 | 7/1968 | Carraro et al. | 204/159.22 |
| 3,442,942 | 5/1969 | Sianesi et al. | 260/544 |
| 3,467,635 | 9/1969 | Brasen et al. | 260/80.76 |
| 3,505,411 | 4/1970 | Rice | 260/615 |
| 3,699,145 | 10/1972 | Sianesi et al. | 260/463 |
| 3,715,378 | 2/1973 | Sianesi et al. | 260/463 |
| 3,752,787 | 8/1973 | de Brunner | 260/41 B |
| 3,810,874 | 5/1974 | Mitsch et al. | 260/75 H |
| 3,810,875 | 5/1974 | Rice et al. | 260/899 |
| 3,849,504 | 11/1974 | Mitsch | 260/615 |
| 3,876,654 | 4/1975 | Pattison | 260/30.4 |
| 4,035,565 | 7/1977 | Apotheker et al. | 526/249 |
| 4,094,911 | 6/1978 | Mitsch et al. | 260/615 |
| 4,214,060 | 7/1980 | Apotheker et al. | 525/387 |
| 4,233,421 | 11/1980 | Worm | 525/343 |
| 4,259,463 | 3/1981 | Moggi et al. | 525/331 |
| 4,263,414 | 4/1981 | West | 525/102 |
| 4,287,320 | 9/1981 | Kolb | 525/340 |
| 4,358,559 | 11/1982 | Holcomb et al. | 524/380 |
| 4,446,270 | 5/1984 | Guenthner et al. | 524/433 |
| 4,450,263 | 5/1984 | West | 526/249 |
| 4,810,760 | 3/1989 | Strepparola et al. | 525/359.3 |
| 4,882,390 | 11/1989 | Grootaert et al. | 525/326.3 |
| 4,894,418 | 1/1990 | Strepparola et al. | 525/185 |
| 5,026,786 | 6/1991 | Marchionni et al. | 525/356 |
| 5,086,123 | 2/1992 | Guenther et al. | 525/276 |
| 5,266,650 | 11/1993 | Guerra et al. | 525/326.4 |
| 5,384,374 | 1/1995 | Guerra et al. | 525/326.4 |

FOREIGN PATENT DOCUMENTS

| | | | |
|---|---|---|---|
| 0 222 201 | 5/1987 | European Pat. Off. | C08L 21/00 |
| 0 310 966 | 4/1989 | European Pat. Off. | C08L 27/12 |
| 0 648 787 | 10/1993 | European Pat. Off. | C08F 214/26 |
| 43 33 584 | 4/1994 | Germany | C08L 27/12 |

OTHER PUBLICATIONS

Brullo, R.A., "Fluoroelastomer Rubber for Automotive," *Automotive Elastomer & Design* (Jun. 1985).

Brullo, R.A., "Fluoroelastomer Seal Up Automotive Future," *Materials Engineering* (Oct. 1988).

S. Smith, "Fluoroelastomers," *Preparation, Properties, and Industrial Applications of Organo Fluorine Compounds*, pp. 255–263 (1982).

Kirk–Othmer, *Encyclopedia of Chemical Technology*, "Fluorocarbon Elastomers," 4th ed., vol. 8, pp. 990–1005, John Wiley & Sons, New York (1979).

G. Caporiccio et al., "Perfluoropolyether Fluids for Vacuum Technologies," *Ind. Eng. Chem. Prod. Res. Dev.*, vol. 21, pp. 515–519 (1982).

Nersasian, Defensive Publication T107,801, dated May 5, 1987.

*Primary Examiner*—Peter D. Mulcahy
*Attorney, Agent, or Firm*—Gary L. Griswold; Walter N. Kirn; John A. Burtis

[57] ABSTRACT

Fluorocarbon elastomer gum is compounded with fluorinated ether compositions, the resulting compounded gum is shaped and heated to form a cured shaped article such as automotive fuel line hose or O-ring.

24 Claims, No Drawings

FLUOROELASTOMER COMPOSITIONS

FIELD OF THE INVENTION

This invention relates to fluorocarbon elastomers and their curing. In another aspect it relates to fluorinated ether compositions used in curing fluorocarbon elastomers. In another aspect it relates to fluorocarbon gum compositions containing fluorinated ether compositions. In a further aspect it relates to cured, shaped articles of fluorocarbon elastomer, such as automotive fuel line hose and O-ring seals.

BACKGROUND OF THE INVENTION

Fluorocarbon elastomers are synthetic elastomeric polymers with a high fluorine content—see, for example, W. M. Grootaert., G. H. Millet, & A. T. Worm, *Fluorinated Elastomers*, 8 KirK-OTHMER ENCYCLOPEDIA OF CHEMICAL TECHNOLOGY 990–1005 (4th ed., 1993). Fluorocarbon elastomers, particularly the copolymers of vinylidene fluoride with other ethylenically unsaturated halogenated monomers, such as $C_3F_6$ (hexafluoropropene), have become the polymers of choice for high temperature applications, such as seals, gaskets, and linings, especially when shaped articles thereof are subject to exposure to aggressive or harsh environments, such as solvents, lubricants, and oxidizing or reducing conditions. A major drawback to many applications of shaped articles made of such fluorocarbon elastomers has been their inability to satisfactorily function at low temperatures. At temperatures only slightly below 0° C., the articles become stiff and fail to perform satisfactorily. Many fluoroelastomers also exhibit a tendency to become "scorchy," i.e., they cure prematurely or too rapidly when compounded. Fluoroelastomers may also adhere to dies upon curing making removal of the shaped fluoroelastomer article difficult.

Such fluorocarbon elastomers in general can be compounded and cured to have high tensile strength, good tear resistance, and low compression set. Such compounded polymers are typically fabricated into automotive engine oil seals, fuel system components, such as fuel line hoses and O-ring seals, and drive train seals. Smaller, hotter-running automotive engines, modern fuel blends, and aggressive oil additives and other chemical substances used in operating the engines have made fluorocarbon elastomers the polymers of choice for a host of elastomeric engine components where reliable sealing is required and is of environmental concern—see R. A. Brullo, *Fluoroelastomer Rubber for Automotive Applications*, AUTOMOTIVE ELASTOMER & DESIGN, June 1985, and *Fluoroelastomers Seal Up Automotive Future*, MATERIALS ENGINEERING, October, 1988.

Most commercially available fluorocarbon elastomers, such as the illustrative polymers described above, are sold, for example, under the trademarks "Aflas," "Fluorel" and "Viton." Some of these are crosslinked with aromatic polyhydroxy compounds, such as bisphenols, which are compounded with the elastomer gum along with a curing accelerator, such as a quaternary phosphonium salt, and acid acceptors, such as magnesium oxide and calcium hydroxide—see, for example, U.S. Pat. No. 4,287,320 (Kolb). Others are bromine-containing, peroxide-curable fluorocarbon elastomers—see U.S. Pat. Nos. 4,035,565 (Apotheker et al.) and 4,450,263 (West).

Several general types of fluorinated ethers have been described in the literature. One type is characterized by one of several homopolymeric segments or blocks of repeating units of the formula —$CF(CF_3)CF_2$—O— and made from hexafluoropropylene epoxide, see e.g., U.S. Pat. No. 3,250,807 (Fritz et al.). Another type is that characterized by blocks of repeating units of the formula —$CF_2CF_2O$— and made from tetrafluoroethylene epoxide, see e.g., U.S. Pat. No. 3,125,599 (Warnell). Others, made by reacting oxygen with tetrafluoroethylene or hexafluoropropylene, are characterized by a backbone made of repeating —$CF_2O$— units, see e.g., U.S. Pat. No. 3,392,097 (Carraro et al.), or —CF($CF_3$)$CF_2O$— units, see e.g., U.S. Pat. No. 3,442,942 (Sianesi et al.), or, in addition to either of these units, units of the formula —CF($CF_3$)O—, see e.g., U.S. Pat. No. 3,699,145 (Sianesi et al.), or a backbone consisting of randomly distributed —$CF_2O$— and $CF_2CF_2O$— units, see e.g. U.S. Pat. No. 3,715,378 (Sianesi et al.), or a backbone made up of —CF($CF_3$)$CF_2O$— and —$CF_2CF_2O$— units and, optionally, —$CF_2O$— and —CF($CF_3$)O— units. Another type of fluorinated ether is that characterized by backbone units of the formula —$(CF_2)_aO(CF_2)_b$— made by photopolymerization, see e.g., U.S. Pat. No. 3,505,411 (Rice) and U.S. Pat. No. 3,849,504 (Mitsch et al.).

U.S. Pat. Nos. 3,810,874 (Mitsch et al.) and 4,094,911 (Mitsch et al.) disclose poly(perfluoro-alkylene oxides) terminated with polymerizable functional groups that can be polymerized to prepare certain polymers, e.g., polyurethanes, having low glass transition temperatures and low-temperature flexibility. U.S. Pat. No. 3,810,875 (Rice et al.) discloses use of poly(perfluoroalkylene oxide) peroxides with ethylenically unsaturated monomers in making block copolymers having good low-temperature flexibility. Fluorinated ethers with nonfunctional terminal moieties are sold under the trademarks "Krytox" and "Fomblin" for use as vacuum pump fluids, see e.g., G. Caporiccio et al., 21 IND. ENG. CHEM. PROD. RES. DEV. 515–19 (1982).

U.S. Pat. No. 4,810,760 (Strepparola et al.) discloses compositions of fluoroelastomers crosslinked with dihydroxypolyfluoroethers. The dihydroxypolyfluoroethers of Strepparola contain either branched moieties, are random copolymers containing —$CF_2O$— repeating units, or contain partially fluorinated repeat units. When used to crosslink fluorocarbon elastomers, the fluorinated ethers of Strepparola are said to give materials with improved heat stability and greater resistance to compression set. U.S. Pat. No. 4,894,418 (Strepparola et al.) discloses compositions of fluoroelastomers comprising, as a processing coadjuvant, a mono- or dihydroxypolyfluoroether. These mono- or dihydroxypolyfluoroethers have structures similar to those disclosed in U.S. Pat. No. 4,810,760 (Strepparola et al.). The addition of these mono- or dihydroxypolyfluoroethers to conventional vulcanizable fluoroelastomer compositions is said to improve the processability of the resulting mixture and the low temperature brittle point of the cured mixture.

U.S. Pat. No. 5,026,786 (Marchionni et al.) discloses a process for the manufacture of certain perfluoropolyether. These perfluoropolyethers comprise randomly distributed perfluoroxyalkylene units. These perfluoropolyether are said to improve the extrudability of elastomer compositions and to decrease the adhesion of vulcanized articles to molds.

European Pat. Pub. No. 222,201 (Tommasi et al.) discloses vulcanizable rubber blends comprising certain perfluoropolyether. These perfluoropolyethers have brominated or fluorinated end groups. These blends are said to have improved processability.

European Pat. Pub. No. 310,966 (Arcella et al.) discloses rubber blends comprising certain perfluoropolyethers. These perfluoropolyethers comprise perfluoroalkyl end groups. These rubber blends are said to have improved mold-release properties.

U.S. Pat. Nos. 5,384,374 and 5,266,650, both to Guerra et al., describe certain classes of fluorinated ether compositions comprising functional fluoroaliphatic mono- and polyethers useful as low-temperature flexibilizers, imparting low temperature flexibility to cured fluorocarbon elastomer compositions and also useful in certain aspects as crosslinking agents in curable fluoroelastomer compositions. The fluorinated ether compositions taught by these patents, however, exist largely as liquids within processing temperature ranges and phase separate from those solid fluoroelastomer gums and attendant processing adjuvants into which they are milled. Such phase separation can greatly complicate the processing of these conventional curable fluoroelastomer compositions. For example, the fluorinated ether compositions taught by these references must be milled into the curable fluoroelastomer gum with inorganic filler and other adjuvants to achieve a uniform compounded mixture. This inability to compound the ether composition into the fluoroelastomer gum without the aid of other adjuvants prevents a user from incorporating the ether compositions into an incorporated curable fluoroelastomer gum stock. Such an incorporated cure gum stock is a highly useful and desirable fluoroelastomer composition.

SUMMARY OF THE INVENTION

Briefly, in one aspect, this invention provides a fluorocarbon elastomer composition comprising: (1) fluorocarbon elastomer gum, such as a copolymer of vinylidene fluoride and hexafluoropropene, and (2) a fluorinated ether composition comprising a functional fluoroaliphatic mono- or polyether salt, e.g.:

HOMgOCH$_2$—CF$_2$OCF$_2$CF$_2$OCF$_2$—CH$_2$OMgOH,

HOMgOCH$_2$—CF$_2$O(CF$_2$CF$_2$OCF$_2$CF$_2$OCF$_2$O)$_n$CF$_2$—CH$_2$OMgOH

HOMgOCH$_2$—CF$_2$O(CF$_2$CF$_2$O)$_x$(CF(CF$_3$)CF$_2$O)$_y$(CF$_2$O)$_n$CF$_2$—CH$_2$OMgOH

HOMgOCH$_2$—CF$_2$CF$_2$OCF$_2$CF$_2$—CH$_2$OMgOH,

CF$_3$—O(CF$_2$CF$_2$O)$_n$—CF$_2$—CH$_2$OMgOH

Cl$^-$NH$_3$$^+$—CH$_2$—CF$_2$OCF$_2$CF$_2$OCF$_2$—CH$_2$—NH$_3$$^+$Cl$^-$

Cl$^-$NH$_3$$^+$—CH$_2$—CF$_2$CF$_2$OCF$_2$CF$_2$—CH$_2$OCaCl, and

HOMgOCH$_2$—CF$_2$OCF$_2$CF$_2$OCF$_2$—CH$_2$OCH$_2$CH=CH$_2$

The functional fluoroaliphatic ether may be a perfluoroether structure that comprises linear or branched perfluoroxyalkylene ether groups wherein said groups may be random, block, or any combination thereof. Each end of the perfluoroether structure is bonded to a terminal group. At least one of such terminal groups is an alkoxide metal salt such as —CH$_2$OMgOH, —CH$_2$OCaOH, and —CH$_2$OZnOH, etc, or is amino salt such as —CH$_2$NH$_3$$^+$Cl$^-$. The fluorinated ether compositions of this invention act as low-temperature flexibilizers, imparting improved low-temperature flexibility to the cured fluorocarbon elastomer composition. The fluorinated ether compositions are also largely solid both at room temperature and at those elevated temperatures incurred during mixing and compounding of the fluorocarbon elastomer composition, thereby greatly improving the overall processability of the composition.

In another aspect, the fluorinated ether compositions of the invention imparts improved flow properties to the curable fluorocarbon elastomer composition.

In a further aspect, said fluorocarbon elastomer composition can be compounded to be resistant to scorch during mixing, processing, and during shelf storage prior to curing.

DETAILED DESCRIPTION OF THE INVENTION

A first class of fluorinated ether compositions comprises a mixture of fluoroaliphatic ether salts having an average number of reactive terminal groups per fluorinated ether molecule greater than 1.0 and less than or equal to 2.0. A second class of fluorinated ether compositions comprises a mixture of fluoroaliphatic ether salts having an average number of reactive terminal groups per fluorinated ether molecule less than or equal to 1.0.

The fluorocarbon elastomer gum and fluorinated ether composition can be compounded or mixed in one or several steps. The mixture can be processed and shaped, for example, by extrusion (e.g., in the form of a hose or hose lining) or molding (e.g., in the form of an O-ring seal), and the shaped article can be heated to cure the gum composition and form a cured elastomer article. When the fluorinated ether composition used in a reactive mixture with the fluorocarbon elastomer gum is of said second class, the resulting composition is further compounded with a crosslinking agent, for example, 2,2-bis-(4-hydroxyphenyl) hexafluoropropane, to obtain a curable composition.

The cured fluorocarbon elastomer mixture, containing either class of fluorinated ether composition, has excellent low-temperature flexibility while retaining the desired physical properties (e.g., tensile strength and elongation) of conventionally compounded and cured fluorocarbon elastomer compositions. Particularly useful articles that can be fabricated from the fluorocarbon elastomer compositions of this invention are fluorocarbon elastomer automotive components, such as those described in the two above cited journal articles of Brullo, e.g., fuel line hoses.

The first class of fluorinated ether composition useful in the present invention comprises functional fluoroaliphatic ether salts whose composition is composed predominantly of difunctional salts. The fluorinated ether composition of this first class has an average number of reactive terminal groups per fluorinated ether molecule greater than 1.0 and less than or equal to 2.0. The difunctional salts of this first class include those that may be represented generally by Formula I below.

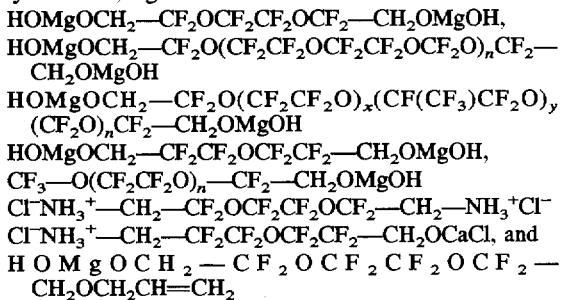

(X)$_m$—(Y)$_x$—Q—R$_f$—O—(R$_{fo}$)$_n$—R$_f$—Q—(Y)$_x$—(X)$_m$     (I)

wherein:

each R$_f$ is, independently, a linear or branched perfluoroalkylene group of 1 to about 20 carbon atoms;

R$_{fo}$ comprises linear or branched perfluoroalkylene ether groups wherein said groups may be random, block, or any combination thereof, representative R$_{fo}$ groups include:

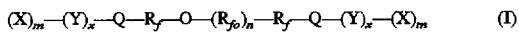

—(CF$_2$)$_2$—O—, —CF$_2$O , —(CF$_2$)$_3$—O—, —(CF$_2$)$_4$—O—,

—CF$_2$—CF$_2$—O—CF$_2$—O—,—CF$_2$—CF$_2$—O—CF$_2$—CF$_2$—O—CF$_2$—O—,

—(CF$_2$—CF(CF$_3$)—O)$_n$—, each Q is, independently, a divalent linking group that is preferably selected from the group consisting of:

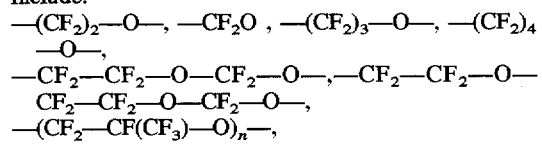

—O—, —C$_6$H$_3$(R')O—, —CH$_2$CR$_2$O—,—CR$_2$O—,

Z—N$^+$H$_3$—C$_6$H$_3$(R')—, and Z—NH$_3$$^+$—CH$_2$— where R is a hydrogen atom or is a fluorinated or non-fluorinated alkyl group preferably having from 1 to about 2 carbon atoms and preferably fluorinated, R' is a hydrogen or halogen atom or is a substituted or unsubstituted, cyclic or acyclic alkyl or aryl group having 1 to 10 carbon atoms that may optionally contain one or more catenary heteroatoms, and where Z is a anion such as a halide; the oxygen atoms depicted in the formulas immediately above will be connected to the depicted Y groups where such Y groups are present;

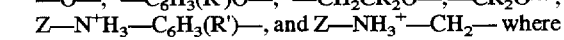

each Y is, independently, a divalent metal atom, such as Mg, Zn, Ca, or Ni, or a monovalent metal atom, such a Na, Li, or K; a divalent metal is preferred, Mg being particularly preferred;

each X is, independently, a halogen atom, a hydroxyl group, or is of the formula —OR" or —OOCR" where R" is a short-chain alkyl group having from 1 to about 4 carbon atoms;

n is a number from 0 to 30;

x is 0 or 1 with the proviso that when Q is terminated by an amino group, such as where Q is Z—$N^+H_3$—$C_6H_3(R')$— or Z—$N^+H_3$—$CH_2$— as depicted supra, x is 0; and m is 0 or 1 with the proviso that when Y is a monovalent metal atom, such as Na, Li, or K, m is 0; when Y is a divalent metal atom, m is 1; and when x is 0, m is 0.

The difunctional fluoroaliphatic ether salts depicted above by Formula I will typically range in number average molecular weight between about 250 and about 3,000, though salts of higher or lower molecular weights are also considered useful. It will be understood further that the difunctional salts may oligomerize, such as when the salt is terminated with a hydrolizable group, for example where the terminal X depicted in Formula I is a hydroxyl group or is of the formula —OR or —OOCR. Oligomers, so formed, are also useful in the practice of the invention and are considered within the scope thereof.

The second class of fluorinated ether composition useful in the present invention comprises functional fluoroaliphatic ether salts whose composition is composed predominantly of monofunctional salts. The fluorinated ether composition of this second class has an average number of reactive terminal groups per fluorinated ether molecule less than or equal to 1.0. The monofunctional salts of this second class include those that may be represented generally by Formula II below.

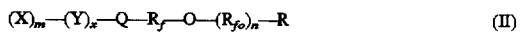

(II)

wherein:

$R_f$, $R_{fo}$, Q, Y, X, x, m, and n are as defined supra for Formula I; and

R is a monovalent, fluorinated or non-fluorinated alkyl or aryl group containing from 1 to about 10 carbon atoms or is a fluorinated or non-fluorinated allyl group containing from 2 to 10 carbon atoms.

The fluorocarbon elastomer compositions of the invention may be further compounded and cured according to standard methods. In order to form cured articles, the compositions comprising the fluorochemical ether compositions of the second class, represented by Formula II, require further compounding with a crosslinking agent, either the fluorinated ether composition of this invention, represented by Formula I, or with a conventional cure system, such as a polyhydroxy, or a peroxide cure system.

A common crosslinking agent for fluorocarbon elastomer gum is a polyhydroxy compound. The polyhydroxy compound used in its free or non-salt form and as the anionic part of the salt component of the crosslinking agent can be any of those polyhydroxy compounds known in the art to function as a crosslinking agent or co-curative for fluoroelastomers, such as those polyhydroxy compounds disclosed in U.S. Pat. Nos. 4,259,463 (Moggi et al.), 3,876,654 (Pattison), 4,233,421 (Worm), and U.S. Defensive Publication T107,801 (Nersasian). For example, representative aromatic polyhydroxy compounds include any one of the following: di-, tri-, and tetrahydroxybenzenes, naphthalenes, and anthracenes, and bisphenols of the Formula:

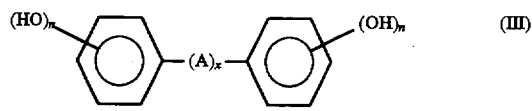

(III)

wherein A is a difunctional aliphatic, cycloaliphatic, or aromatic radical of 1 to 13 carbon atoms, or a thio, oxy, carbonyl, sulfonyl, or sulfonyl radical, A is optionally substituted with at least one chlorine or fluorine atom, x is 0 or 1, n is 1 or 2, and any aromatic ring of the polyhydroxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. It will be understood from the above bisphenol Formula III that the —OH groups can be attached in any position (other than number one) in either ring. Blends of two or more such compounds can also be used. One of the most useful aromatic polyphenols is the bisphenol compound known as Bisphenol AF, which is 2,2-bis(4-hydroxyphenyl)hexafluoropropane. The compounds 4,4'-dihydroxydiphenyl sulfone (Bisphenol S) and 2,2-bis(4-hydroxyphenyl)propane (Bisphenol A) are also considered useful in this invention. Another useful aromatic polyhydroxy compound is hydroquinone. Others are dihydroxybenzenes such as catechol, resorcinol, 2-methyl resorcinol, 5-methyl resorcinol, 2-methyl hydroquinone, 2,5-dimethyl hydroquinone, and 2-t-butyl hydroquinone, 1,5-dihydroxynaphthalene and 9,10-dihydroxyanthracene.

Representative aliphatic polyhydroxy compounds which can also be used as the polyhydroxy compound in this invention include fluoroaliphatic diols, e.g. 1,1,6,6-tetrahydrooctafluorohexanediol, and others such as those described in U.S. Pat. No. 4,358,559 (Holcomb et al.) and references cited therein. Derivatives of polyhydroxy compounds can also be used such as those described in U.S. Pat. No. 4,446,270 (Guenthner et al.) and include, for example, 2-(4-allyloxyphenyl)-2-(4-hydroxyphenyl)propane. Mixtures of two or more of the polyhydroxy compounds can be used.

The organo-onium compound which can be incorporated into or compounded with the fluoroelastomer gum as a co-curing agent or vulcanization accelerator include those known and described in the art—see, for example, the description of such organo-onium compounds in U.S. Pat. No. 4,882,390 (Grootaert et al.). The organo-onium compounds that can be used include quaternary organo-onium compounds, such as ammonium, arsonium, phosphonium, stibonium, amino-phosphonium, phosphorane (e.g., triarylphosphorane), and iminium compounds, and sulfonium compounds. Mixtures of organo-onium compounds are also useful in this invention. The ammonium, phosphonium, arsonium, and stibonium salts or compounds preferably have the general formula:

(IV)

wherein:

Q is nitrogen, phosphorous, arsenic or antimony;

X is an organic or inorganic anion (e.g., halide, sulfate, acetate, phosphate, phosphonate, hydroxide, alkoxide, phenoxide, or bisphenoxide);

n is equal to the valence of the anion X; and each R is independently an alkyl, aryl, alkenyl, or combinations thereof; each R can be substituted with chlorine, fluorine, bromine, cyano, —OR' or —COOR' where R' is a $C_1$ to $C_{20}$ alkyl, aryl, aralkyl, or alkenyl, and any pair of the R groups can be connected with each other and with the Q atom to form a heterocyclic ring;

one or more of the depicted R groups may be chosen such that the resulting organo-onium is acid functional, such as when R is of the formula —$CY_2COOR''$ or is terminated by a group of the formula —COOA where A is a hydrogen atom or is a metal cation, where Y is a hydrogen or halogen atom or is a substituted or unsubstituted alkyl or aryl group having from 1 to about 6 carbon atoms, and where R" is a hydrogen atom, a metal cation, an alkyl group, or is an acyclic anhydride, e.g., a group of the formula —COR'" where R'" is an alkyl group or is a group that itself contains organo-onium (i.e., giving a bis organo-onium).

A preferred organo-onium compound where the aromatic polyhydroxy compound used is Bisphenol AF, is where in Formula IV the Q is phosphorous, X is a chloride anion, n is 1, and three of the R groups are phenyl moieties and the remaining R group is a benzyl moiety. A preferred class of Formula IV is where at least one of the R groups is alkyl or alkenyl. In another class of quaternary organo-onium compounds which can be used in this invention, the nitrogen, phosphorus, arsenic or antimony atom may be a heteroatom in a cyclic structure, e.g., 8-benzyl-1,8-diaza-bicyclo[5,4,0]-7-undecenium chloride. Another class which can be used is amino-phosphonium compounds, some of which are described, for example, in U.S. Pat. No. 4,259,463 (Moggi et al.). Another useful class is phosphorane compounds disclosed, for example, in U.S. Pat. Nos. 3,752,787 (de Brunner) and 4,882,390 (Grootaert et al.). Another class of quaternary organo-onium compounds useful in this invention are iminium compounds, where are also described in said U.S. Pat. No. 4,882,390.

An especially preferred class of organo-oniums are acid functional phosphoniums, such as depicted above in Formula IV where Q is phosphorus and where one of the depicted R groups is —$CY_2COOR''$ where Y and R" are as defined by Formula IV. When used in combination with the fluorinated ether compositions, the fluoroelastomer compositions of such an embodiment of the invention possess superior cure characteristics, scorch safety, and shelf stability.

Fluoroaliphatic sulfonamides can also be added to the compositions of the invention, including those of the formula $R_fSO_2NHR''$, where R" is a hydrogen atom or alkyl radical having, for example, from 1 to 20 carbon atoms, preferably from 1 to 12 carbon atoms, $R_f$ is a fluoroaliphatic radical such as a perfluoroalkyl, e.g., $C_nF_{2n+1}$ where n is 1 to 20, or perfluorocycloalkyl, e.g., $C_nF_{2n-1}$ where n is 3 to 20, such compounds being described, for example, in U.S. Pat. No. 5,086,123 (Guenther et al.). The fluoroaliphatic sulfonamide is preferably a perfluoroalkylsulfonamide and may be added as a separate compound, or as the anion of the organo-onium compound.

One or more monohydroxyfunctional phenols may also be admixed with the fluoroelastomer compositions of the invention. The monophenol compounds act to delay the cure of the fluoroelastomer compositions and thereby further improve the scorch safety of the compositions over those compositions formulated with their absence. Monohydroxy functional phenols useful for this purpose include those of the formula:

wherein:

R is a halogen atom or an acyl, aryl, polyaryl (fused to or separated from the aromatic ring) or alkyl radical substituent (or any combination thereof), the latter three of which may be straight-chained, branched, cyclic, or halogenated;

when R is a halogen atom, x may be between 1 and 5, otherwise, x may be between 1 and 3;

the —R group may optionally contain one or more catenary heteroatoms, i.e. a non-carbon atom such as nitrogen or oxygen; However, where x is 1 and where the single —R group is a carboxylic acid group and the resulting compound is classifiable as a benzoic acid, (e.g. where R is —COOH), the carboxylic acid substituent must be placed in either the meta or para position on the ring relative to the hydroxyl group.

It will be understood from the above Formula V that the constituent —R group can otherwise be attached in any position in the ring relative to the hydroxy functional group. Preferably, however, to avoid possible steric hindrance of the —OH functionality, said R group is configured in either the meta or para position relative to the hydroxyl group where said —R group contains more than two carbon atoms. The constituent —R group may contain a phenol where the resulting compound, classifiable as a polyphenol, is monohydroxy functionally hindered by steric effects on one of the hydroxyl groups (i.e. there are one or more substituent groups that contain more than 2 carbon atoms in the meta or para position relative to that hindered hydroxyl group). Such a monohydroxyfunctionally hindered polyphenol will act for the purposes of the present invention as a monophenol, such as, for example, where—R is 2,6-di t-butyl 4-hexafluoropropyl phenol. Representative individual constituent—R groups according to the above-described formula V include the following: —CN, —$NO_2$, —$COC_6H_5$, —$COCH_2C_6$, $H_5$, —$COCH_3$, —$COOCH_3$, —$CF_3$, —$NHCH_2COOH$, —COOH, —$C_6H_5$, —$CH_2OH$.

Fillers can be mixed with the fluoroelastomer gum to improve molding characteristics and other properties. When a filler is employed, it can be added to the vulcanization recipe in amounts of up to about 100 parts per hundred parts by weight of gum, preferably between about 15 to 50 parts per hundred parts by weight of the gum. Examples of fillers which may be used are reinforcing thermal grade carbon blacks or non-black pigments of relatively low reinforcement characteristics such as clays and barytes.

Fluorocarbon elastomers which can be used in this invention include those described, for example, in the aforementioned prior art, e.g., U.S. Pat. Nos. 3,159,609 (Harris et al.), 3,467,635 (Brasen et al.), 4,214,060 (Apotheker), 4,233,421 (Worm), and 4,263,414 (West). Some of these are commercially available, sold under trademarks such as "Fluorel" and "Viton", and are copolymers whose interpolymerized units are generally derived from vinylidene fluoride and one or more other co-monomers. Other useful fluorocarbon elastomers include copolymers of tetrafluoroethylene and propylene, such as those commercially available as Aflas™ elastomers. Among the fluoroelastomer polymers which may be compounded in accordance with this invention are the elastomeric copolymers whose interpolymerized units are derived from two or more of the following fluoromonomers: vinylidene fluoride, hexafluoropropene, chlorotrifluoroethylene, 2-chloropentafluoropropene, fluorinated methyl vinyl ether, tetrafluoroethylene, 1-hydropentafluoropropene, dichlorodifluoroethylene, trifluoroethylene, 1,1-chlorofluoroethylene, and mixtures thereof. Said fluoromonomers may also be copolymerized with other compounds such as non-fluorinated alpha-olefin co-monomers, e.g., ethylene or propylene. The preferred elastomers are copolymers of vinylidene fluoride with at least one terminally ethylenically-unsaturated fluoromonomer containing at least one fluorine atom substituent on each double-bonded carbon atom, each carbon atom of said fluoromonomer being substituted only with fluorine and optionally with chlorine, hydrogen, lower fluoroalkyl radical, or lower fluoroalkoxy radical; particularly preferred are hexafluoropropene, tetrafluoroethylene, chlorotrifluoroethylene, and 1-hydropentafluoropropene. Particularly preferred are the fluorinated elastomers produced by copolymerizing vinylidene fluoride with hexafluoropropene as described in U.S. Pat. Nos. 3,051,677 (Rexford) and 3,318,854 (Pailthorp et al.), and those copolymers produced by copolymerizing vinylidene fluoride, hexafluoropropene, and tetrafluoroethylene as described in U.S. Pat. No. 2,968,649 (Honn et al.). The elastomeric copolymers of hexafluoropropene and vinylidene fluoride preferably will have between about 15 and about 50 mole percent hexafluoropropene, optionally with the addition of up to 30 mole percent tetrafluoroethylene. Mixtures or blends of elastomers, e.g., of different viscosities, are also suitable.

The curable fluoroelastomer composition of the invention may be formed as an incorporated cure stock composition comprising fluorocarbon elastomer, organo-onium, fluorinated ether composition, and conventional crosslinking agent, if any. Such a composition may be easily compounded without the addition of inorganic filler or other such adjuvants, and is considered shelf-stable. At some time immediately prior to use of the fluoroelastomer composition, the incorporated cure stock composition may be further compounded with fillers and other desired adjuvants and processed or cured using conventional methods.

The relative amounts of the various ingredients in preferred fluorocarbon elastomer compositions of this invention, chosen to provide the desired cure rate and degree of cure, are illustrated for onium curable elastomer compositions and for peroxide curable elastomer systems in the table below. The amount of fluorinated ether composition will vary, but generally will be present in an amount sufficient to impart improved low-temperature properties to the cured composition. Where the fluorinated ether composition is used as a crosslinker, it will generally be present in an amount sufficient to crosslink the gum. The amounts given are in terms of parts per 100 parts by weight of the gum, "phr."

| INGREDIENTS | ONIUM CURABLE ELASTOMER SYSTEM |
|---|---|
| Fluorinated ether composition of this invention | 1–40 mmol |
| Polyhydroxy compound (crosslinking agent) | 0*–0.002 mmol |
| Organo-onium compound (co-curing agent) | 0.5–3 mmol |
| Bivalent metal oxide | 2–30 phr |

| INGREDIENTS | ONIUM CURABLE ELASTOMER SYSTEM |
|---|---|
| and/or hydroxide (acid acceptor) | |
| Fillers | 0–100 phr |
| Monohydroxyfunctional phenol | 0–0.002 mmol |

*Note that when the fluorinated ether compositions of the first class (Formula I) are used, it is not required to include crosslinking agents to affect cure.

The aforementioned amounts of the fluorinated ether composition of the invention, which impart improved low-temperature properties to the cured composition, also impart improved flow properties to the curable composition. If desired, the amount of the fluorinated ether may be only an mount sufficient to impart improved flow properties to the curable composition. Generally, as little as 0.5 phr of the fluorinated ether composition will be sufficient to impart improved flow properties.

In accordance with this invention, the desired amounts of compounding ingredients and other conventional adjuvants or ingredients are added to the unvulcanized fluorocarbon gum stock and intimately admixed or compounded therewith by employing any of the usual rubber mixing devices such as Banbury mixers, roll mills, or any other convenient mixing device. The temperature of the mixture during mixing typically will not rise above about 120° C. During mixing the components and adjuvants are distributed uniformly throughout the gum. The curing process typically comprises extrusion of the compounded mixture or pressing the compounded mixture in a mold, e.g., a cavity or a transfer mold, and subsequent oven-curing. Pressing of the compounded mixture (press cure) is usually conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (oven-cured) at a temperature usually between about 150° C. and about 315° C., typically at about 232° C., for a period of from about 2 hours to 50 hours or more depending on the cross-sectional thickness of the article. The compositions of this invention can be used to form seals, O-rings, gaskets, etc.

Objects and advantages of this invention are illustrated in the following nonlimiting examples.

EXAMPLES

Test Methods

In the following examples, indicated results were obtained using the following test methods:

Hardness was determined using ASTM D 2240-85 Method A with a Type A-2 Shore Durometer. Units are reported in points.

Cure Rheology Tests were run on uncured, compounded admixture using a Monsanto Moving Die Rheometer (MDR) Model 2000 in accordance with ASTM D 5289-93a at 177° C., no preheat, 12 minute elapsed time and a 0.5° arc. Minimum torque ($M_L$) and highest torque attained during specified period of time when no plateau or maximum torque is obtained ($M_H$) were reported. Also reported were $t_s2$ (time for torque to increase 2 units above $M_L$, t'50 (time for torque to reach $M_L+0.5(M_H-M_L)$, and t'90 (time for torque to reach $M_L+0.9(M_H-M_L)$.

Press-Cure samples. Unless otherwise noted, 150×150×1.8 mm sheets were prepared for physical property determination by pressing at about 6.9×10³ kPa for 10 min. at 177° C.

Post cure samples were prepared by placing a press-cured sample in a circulating air oven. The oven was maintained at 232° C. and the samples treated for 16 hrs.

Tensile Strength at Break, Elongation at Break, and Modulus at 100% Elongation were determined using ASTM D 412-75 on samples cut from 1.8 mm sheet with ASTM Die D. Units reported in Mega Pascals (M Pa).

10% Retraction (TR-10) ASTM D1329. Units reported in °C.

Molecular weight and functionality of fluorinated ether diols were determined by $^{19}F$ NMR end group analysis.

Compression set determined by ASTM 395-89 method B with 0.139 in. (3.5 mm.) O-rings compressed for 70 hrs at 200° C. Results are reported as %.

Mooney scorch determined by ASTM 1646-94 (MS+1@121° C.). Results are reported as Minimum Viscosity, time to 3 unit rise ($t_3$), time to 10 unit rise ($t_{10}$), and time to 18 unit rise ($t_{18}$).

Mooney viscosity determined by ASTM 1646-94 (ML 1+10@121° C.).

In the examples, the preparation of various fluorinated ether salt compositions and their use as low temperature flexibilizers and/or crosslinking agents for fluorocarbon elastomer gums are described. In preparing the fluorinated ether salt compositions, various dihydro alcohols or diols, prepared as described in U.S. Pat. No. 5,266,650, were converted to their salt by the method described below. Compositions are listed in weight % unless otherwise indicated. The unit "phr" refers to parts per hundred weight of the rubber.

Salt A

A magnesium salt of a fluorinated ether diol was made in a 1000 mL three-necked flask was fitted with a mechanical stirrer, thermometer and a refluxing condenser. The flask was charged with 500 g (0.4 mol) of a fluorinated ether diol of structure: HO—CH$_2$—CF$_2$—O—(CF$_2$CF$_2$O)$_n$CF$_2$—CH$_2$—OH with a molecular weight of 1250, and 259.2 g of a sodium methoxide solution of 25 wt % sodium methoxide (1.2 mole) in methanol. The reaction mixture was stirred and heated to slight reflux for 2–3 hours. In a second flask was prepared a solution of 162.4 g (0.8 mol) of MgCl$_2$6H$_2$O in 350 mL methanol. The freshly prepared sodium dialkoxide salt in the three-necked flask was slowly poured into the second flask containing the MgCl$_2$ and methanol solution. The solution was slowly stirred for 5–6 hours at room temperature. The solution was then quenched with 1500 mL cold water and filtered to collect the solid. The collected solid was washed three times with 600 mL cold water and then dried in an oven at 60° C. overnight. A yield of 498 g was obtained.

Salt B

A calcium salt of a fluorinated ether diol was made in a manner similar to Salt A except CaCl$_2$ was used instead of MgCl$_2$.

Salt C

A magnesium salt of a fluorinated ether alcohol, of structure C$_4$F$_9$OCF$_2$CF$_2$OCF$_2$CH$_2$OH (MW=432), was produced by a procedure similar to that for Salt A.

Commercially available fluoroelastomer gums were compounded with the above prepared fluorinated ether salt compositions and various other ingredients and cured. The cure rheology and physical properties of the cured composition were then determined. The gums used were copolymers which, except as otherwise indicated, have the weight percents of interpolymerized units derived from the monomers shown below. Comparisons were also made using the fluorinated ether compositions before converting to a salt.

| | WEIGHT % MONOMERS | | | | |
|---|---|---|---|---|---|
| Gum | CF$_2$=CH$_2$ | CF$_2$=CFCF$_3$ | CF$_2$=CF$_2$ | CH$_2$=CHCH$_3$ | Mooney Viscosity |
| A | 44.5 | 31.2 | 24.3 | — | 75.0 |
| B | 28.0 | — | 56.8 | 15.2 | 46.0 |
| C | 35.3 | 41.1 | 23.6 | — | 69.0 |
| D | 60.0 | 40.0 | — | — | 38.0 |

Example 1

In Example 1, a compounded fluorelastomer gum of the invention was prepared using 100 g of fluoroelastomer gum A and adding 0.78 g of a 50 wt % solution (0.001 moles of solid) of triphenylbenzyl phosphonium chloride (MW 388.8) cure accelerator, followed by 30 parts Thermax N-990 carbon black, 3 parts Elastomag 170 MgO, and 6 parts Ca(OH)$_2$ using a two-roll mill and conventional techniques.

To this compounded mixture was added 17.4 g (phr) of Salt A, the magnesium salt product described above. Milling continued until a homogenous blend formed. The surface of the blended material was observed to be dry, i.e., There was no separating of any components or exudation af any type.

A quantity of the compounded gum was used for cure rheology testing and the remainder of the gum was press-cured for 10 minutes at 177° C., and then post-cured for 16 hours at 232° C. The results of the rheology tests are shown in Table 2 and the physical property data is shown in Table 3.

Comparative Example C1

In Comparative Example C1, a compounded mixture was prepared and evaluated in a manner similar to Example 1 except 17.0 phr of the fluorinated ether diol used to prepare Salt A was used instead of Salt A. A longer milling time was required to allow the incorporation of the liquid fluorinated ether diol. Also, the surface of the blended material was observed to be slightly oily, particularly if the blended material was in contact with an impervious surface, such as a polyethylene bag. This indicated an incompatibility of some degree between the liquid diol and the other components of the blend.

Example 2

In Example 2, a compounded fluoroelastomer gum of the invention was prepared and evaluated as in Example 1 except 1.0 g (phr) of C$_8$F$_{17}$SO$_2$N(CH$_3$)H, made as described in U.S. Pat. No. 5,086, 123 (Guenthner, Kolb), was additionally added during the milling step. The surface of the blended material was observed to be dry, i.e., There was no separating of any components or exudation of any type.

Comparative Example C2

In Comparative Example C2, a compounded mixture was prepared and evaluated in a manner similar to Example 2 except 17.0 phr of the fluorinated ether diol used to prepare Salt A was used instead of Salt A. A longer milling time was required to allow the incorporation of the liquid fluorinated ether diol. Also, the surface of the blended material was observed to be slightly oily, particularly if the blended material was in contact with an impervious surface, such as a polyethylene bag. This indicated an incompatibility of some degree between the liquid diol and the other components of the blend.

Examples 3–4

In Examples 3–4, compounded fluoroelastomer gums of the invention were made and evaluated as in Example 1 except the ratio of some of the additives was adjusted as shown in Table 1. The surface of the blended materials was observed to be dry, i.e., There was no separating of any components or exudation af any type.

Comparative Example C3 and C4

In Comparative Examples C3 and C4, compounded mixtures were prepared in a manner similar to Comparative Example C2 except the ratio of some of the additives was adjusted as shown in Table 1. The onium cure accelerator concentration is listed in millimoles, the others are shown as parts per hundred parts rubber (phr). A longer milling time was required to allow the incorporation of the liquid fluorinated ether diol. Also, the surface of the blended material was observed to be slightly oily, particularly if the blended material was in contact with an impervious surface, such as a polyethylene bag. This indicated an incompatibility of some degree between the liquid diol and the other components of the blend.

TABLE 1

| Additives | Example | | | | | | | |
|---|---|---|---|---|---|---|---|---|
| | 1 | C1 | 2 | C2 | 3 | C3 | 4 | C4 |
| ONIUM | 1 | 1 | 1 | 1 | 1.5 | 1.5 | 1.5 | 1.5 |
| AMIDE | — | — | 1.0 | 1.0 | — | — | 1.0 | 1.0 |
| DIOL | — | 17.0 | — | 17.0 | — | 17.0 | — | 17.0 |
| SALT | 17.4 | — | 17.4 | — | 17.4 | — | 17.4 | — |

The compounded gums represented by the formulations in Table 1 were evaluated for theological properties which are listed in Table 2.

TABLE 2

| Cure Rheology | Example | | | | | | | |
|---|---|---|---|---|---|---|---|---|
| | 1 | C1 | 2 | C2 | 3 | C3 | 4 | C4 |
| $M_L$ | 2.93 | 1.85 | 2.39 | 1.5 | 3.45 | 1.82 | 2.75 | 1.49 |
| $M_H$ | 15.58 | 15.85 | 21.56 | 19.96 | 18.78 | 18.57 | 23.78 | 21.35 |
| $t_2$ | 1.37 | 0.98 | 1.15 | 0.81 | 0.63 | 0.57 | 0.56 | 0.5 |
| t'50 | 2.71 | 1.63 | 1.87 | 1.29 | 1.21 | 0.88 | 0.82 | 0.68 |
| t'90 | 6.59 | 4.05 | 4.11 | 2.79 | 3.31 | 2.01 | 1.61 | 1.2 |
| Min V | 93.8 | 44.5 | 66.5 | 45.3 | 115 | 47.1 | 94.7 | 48.3 |
| $t_3$, min. | 1.0 | 6.5 | 8.9 | 10.7 | 1.2 | 3.6 | 4.0 | 6.0 |
| $t_{10}$, min. | 4.4 | 8.3 | 10.6 | 13.4 | 4.1 | 4.3 | 4.5 | 7.1 |
| $t_{18}$, min. | 5.7 | 9.2 | 11.4 | 14.8 | 4.8 | 4.7 | 4.9 | 8.3 |

The results in Table 2 indicate a useful cure rheology is obtained using the compounded gums of the invention. Also, a cure latency is observed when comparing the examples with the salt as described in the invention to the comparative examples with the diol.

The physical properties shown in Table 3 were obtained by testing Post-cured samples of the listed examples and comparative examples.

TABLE 3

| Post-Cured Materials | Example | | | | | | | |
|---|---|---|---|---|---|---|---|---|
| | 1 | C1 | 2 | C2 | 3 | C3 | 4 | C4 |
| TENSILE (M Pa) | 11.4 | 11.4 | 14.1 | 12.6 | 12.5 | 11.8 | 13.4 | 11.8 |
| ELONGATION (%) | 209 | 229 | 168 | 168 | 182 | 198 | 145 | 146 |
| MODULUS (M Pa) | 5.6 | 5.0 | 7.3 | 6.3 | 6.9 | 5.9 | 8.3 | 7.1 |
| SHORE A | 72 | 73 | 74 | 74 | 74 | 74 | 74 | 75 |
| COMP. SET (%) | 27.3 | 21 | 16.8 | 16.7 | 22.2 | 17.9 | 17.3 | 17.4 |
| TR-10 (°C.) | −20.6 | −22 | −21.7 | −22 | −21.5 | −21.7 | −21.4 | −21.9 |

The results in Table 3 indicate useful properties may be obtained using the materials of the invention and no detrimental effects were noted when comparing the use of the salt form of the fluorinated ether to the diol form.

Examples 5–8

In Examples 5–8, compounded fluoroelastomer gums of the invention were prepared and evaluated as in Example 1 except the onium cure accelerator used was acetic acid tributyl phosphonium chloride instead of triphenylbenzyl phosphonium chloride. The acetic acid tributyl phosphonium chloride was prepared by adding 11.3 g of(0.12 mol) chloroacetic acid and 20.2 g (0.10 mol) of tributyl phosphine to 100 mL of methanol. The methanol solution was then heated to 35°–40° C. for 20 hours. The methanol was removed and the reaction product washed with hexane and ether to remove unreacted tributyl phosphine and chloroacetic acid. The quantities of the acid-based onium (millimoles) and some of the other additives (phr) used are listed in Table 4. The surface of the blended materials was observed to be dry, i.e., There was no separating of any components or exudation af any type.

Comparative Examples C5–C8

In Comparative Examples C5–C8, compounded mixtures were prepared in a manner similar to Examples 5–8 respectively, except the fluorinated ether diol used to prepare Salt A was used instead of Salt A. The additive levels of some of the additives are shown in Table 4. The onium cure accelerator concentration is listed in millimoles, the others are shown as parts per hundred parts rubber (phr). A longer milling time was required to allow the incorporation of the liquid fluorinated ether diol. Also, the surface of the blended material was observed to be slightly oily, particularly if the blended material was in contact with an impervious surface, such as a polyethylene bag. This indicated an incompatibility of some degree between the liquid diol and the other components of the blend.

TABLE 4

| Additives | Example | | | | | | | |
|---|---|---|---|---|---|---|---|---|
| | 5 | C5 | 6 | C6 | 7 | C7 | 8 | C8 |
| ONIUM | 1 | 1 | 1 | 1 | 1.5 | 1.5 | 1.5 | 1.5 |
| AMIDE | — | — | 1.0 | 1.0 | — | — | 1.0 | 1.0 |
| DIOL | — | 17.0 | — | 17.0 | — | 17.0 | — | 17.0 |
| SALT | 17.4 | — | 17.4 | — | 17.4 | — | 17.4 | — |

The compounded gums represented by the formulations in Table 4 were evaluated for cure rheology to produce the results listed in Table 5.

TABLE 5

| Cure | Example | | | | | | | |
|---|---|---|---|---|---|---|---|---|
| Rheology | 5 | C5 | 6 | C6 | 7 | C7 | 8 | C8 |
| $M_L$ | 2.62 | 1.54 | 2.12 | 1.18 | 2.51 | 1.64 | 2.05 | 1.28 |
| $M_H$ | 14.69 | 16.02 | 19.88 | 18.86 | 18.04 | 18.02 | 22.46 | 20.94 |
| $t_s2$ | 2.62 | 1.51 | 2.46 | 1.53 | 1.20 | 0.87 | 1.24 | 0.87 |
| t'50 | 4.6 | 2.66 | 3.87 | 2.62 | 2.23 | 1.43 | 1.94 | 1.31 |
| t'90 | 8.69 | 6.06 | 7.42 | 5.67 | 5.26 | 3.29 | 4.14 | 2.57 |
| Min V | 60.2 | 41.0 | 62.2 | 42.8 | 62.9 | 45.5 | 62 | 44.1 |
| $t_3$, min. | 25.2 | 18.7 | 31.0 | 8.25 | 12.1 | 11.4 | 16.2 | 7.3 |
| $t_{10}$, min. | 30.2 | 25.5 | 35.9 | 35.3 | 14.3 | 13.3 | 18.9 | 19.0 |
| $t_{18}$, min. | 32.3 | 28.5 | 37.8 | 40.2 | 15.4 | 14.5 | 19.9 | 23.0 |

The results in Table 5 indicate a useful cure theology is obtained using the compounded gums of the invention. Also, a cure latency is observed when comparing the examples with the salt as described in the invention to the comparative examples with the diol.

TABLE 6

| Post-Cured | Example | | | | | | | |
|---|---|---|---|---|---|---|---|---|
| Materials | 5 | C5 | 6 | C6 | 7 | C7 | 8 | C8 |
| TENSILE (M Pa) | 9.7 | 9.5 | 13.6 | 12.2 | 10.9 | 10.0 | 12.3 | 12.3 |
| ELONGATION (%) | 195 | 178 | 160 | 147 | 172 | 160 | 130 | 135 |
| MODULUS (M Pa) | 5.2 | 5.3 | 7.1 | 7.1 | 6.1 | 6.2 | 8.6 | 8.4 |
| SHORE A | 71.6 | 72.5 | 74 | 74 | 73 | 74 | 74.5 | 75 |
| COMP. SET (%) | 32 | 19 | 18.2 | 17.3 | 24.0 | 19.2 | 19.5 | 17.4 |
| TR-10 (°C.) | −21.4 | −22.3 | −22.1 | −22.7 | −21.2 | −22.1 | −21.6 | −22.2 |

The results in Table 6 indicate useful properties may be obtained using the materials of the invention and no detrimental effects were noted when comparing the use of the salt form of the fluorinated ether to the diol form.

Examples 9–11

In Examples 9, 10, and 11, compounded fluoroelastomer gums of the invention were prepared and evaluated in a manner similar to Example 1 except Gum D was used in Example 9, Gum B was used in Example 10, and Gum C was used in Example 11, each as a replacement for Gum A used in Example 1. Also, the onium cure accelerator used in each was acetic acid tributyl phosphonium chloride instead of triphenylbenzyl phosphonium used in Example 1. The level of acid-based onium cure accelerator used was 1.0 millimoles (0.44 phr). The surface of the blended materials was observed to be dry, i.e., There was no separating of any components or exudation af any type. The cure rheology properties are shown in Table 7 and the physical properties tested on Post-Cure samples are shown in Table 8.

TABLE 7

| Cure | Example | | |
|---|---|---|---|
| Rheology | 9 | 10 | 11 |
| $M_L$ | 0.75 | 1.43 | 0.78 |
| $M_H$ | 14.16 | 13.63 | 12.87 |
| $t_s2$ | 2.18 | 10.1 | 2.33 |
| t'50 | 3.78 | 14.78 | 3.84 |
| t'90 | 7.62 | 21.43 | 7.78 |

The results in Table 7 indicate a useful cure rheology is obtained using the compounded gums of the invention

TABLE 8

| Post-Cured | Example | | |
|---|---|---|---|
| Materials | 9 | 10 | 11 |
| TENSILE (M Pa) | 9.5 | 10.2 | 11.2 |
| ELONGATION (%) | 174 | 200 | 194 |
| MODULUS (M Pa) | 5.6 | 4.5 | 5.8 |
| COMP. SET (%) | 29.4 | 31.3 | 36.2 |
| TR-10 (°C.) | −22.4 | −16.9 | −15.8 |

The results in Table 8 indicate useful properties may be obtained using the materials of the invention.

Examples 12 and 13

In Examples 12 and 13, compounded fluoroelastomer gums of the invention were prepared and evaluated in a manner similar to Example 1 except, the onium cure accelerator used was tetrabutyl ammonium chloride at a level of 0.42 phr in Example 12 and triaryl sulfonium chloride at a level of 0.55 phr in Example 13, instead of triphenylbenzyl phosphonium used in Example 1. The surface of the blended materials was observed to be dry, i.e., There was no separating of any components or exudation af any type. The cure rheology properties are shown in Table 9 and the physical properties tested on Post-Cure samples are shown in Table 10.

TABLE 9

| Cure | Example | |
|---|---|---|
| Rheology | 12 | 13 |
| $M_L$ | 2.45 | 2.40 |
| $M_H$ | 18.9 | 12.19 |
| $t_s2$ | 0.85 | 1.34 |
| t'50 | 1.34 | 2.92 |
| t'90 | 2.70 | 7.01 |

The results in Table 9 indicate a useful cure rheology is obtained using the compounded gums of the invention.

TABLE 10

| Post-Cured Materials | Example 12 | Example 131 |
| --- | --- | --- |
| TENSILE (M Pa) | 10.5 | 9.8 |
| ELONGATION (%) | 165 | 273 |
| MODULUS, (M Pa) | 6.6 | 4.1 |
| COMP. SET, (%) | 29.9 | 45.2 |
| TR-10 (°C.) | −20.2 | −19.8 |

The results in Table 10 indicate useful properties may be obtained using the materials of the invention.

Example 14

In Example 14, a compounded fluoroelastomer gum of the invention was prepared and evaluated in a manner similar to Example 7 except Salt B was used instead of Salt A and the level of addition was 17.7 phr instead of 17.4 phr. The surface of the blended material was observed to be dry, i.e., There was no separating of any components or exudation af any type.

The compounded fluoroelastomer gum cured as evidenced by the MDR results of $M_L=2.5$, $M_H=19.4$, $t_s2=0.4$, t'50=0.71 and t'90=3.11.

Example 15

In Example 15, a compounded fluoroelastomer gum of the invention was prepared and evaluated in a manner similar to Example 7 except Salt C [thought to be $(C_4F_9OCF_2CF_2OCF_2CH_2O)_2Mg$] was used instead of Salt A and the level of addition was 10.2 phr instead of 17.4 phr. Additionally, 1.47 g of Bisphenol AF (4,4'HOC$_6$H$_4$C(CF$_3$)$_2$ C$_6$H$_4$OH) was added as a cross linking agent. The surface of the blended material was observed to be dry, i.e., There was no separating of any components or exudation af any type.

The compounded fluoroelastomer gum cured as evidenced by the MDR results of $M_L=3.1$, $M_H=14.7$, $t_s2=1.1$, t'50=1.6 and t'90=2.2. Physical property data after post cure include tensile of 13.0M Pa, elongation of 200%, modulus of 5.8M Pa, Shore hardness of 77 and TR-10 of −20.2° C.

We claim:

1. A fluorocarbon elastomer composition comprising: (1) fluorocarbon elastomer gum, and (2) a fluorinated ether composition comprising a functional fluoroaliphatic ether salt that comprises linear or branched perfluoroxyalkylene ether groups wherein said groups may be random, block, or any combination thereof wherein each end of the functional fluoroaliphatic ether salt is bonded to a terminal group wherein at least one of such terminal groups is an alkoxide metal salt or is an amino salt.

2. The composition of claim 1 wherein said fluorinated ether composition is present in an amount sufficient to impart, to the composition in its cured sate, improved low-temperature flexibility.

3. The composition of claim 1 wherein the said fluorinated ether composition is present in amount constituting between 0.5 to about 50 weight percent based on the weight of said fluoroelastomer gum.

4. The composition of claim 1 further comprising a curing system.

5. The composition of claim 1 wherein said gum comprises a polymer whose interpolymerized units comprise units derived from two or more of the following monomers, $CF_2=CH_2$, $CF_2=CFCF_3$, $CF_2=CF_2$, $CH_2=CHCH_3$, $CF_2=CFOCF_3$.

6. The composition of claim 1 wherein said gum comprises a copolymer of vinylidene fluoride, hexafluoropropene, and, optionally, tetrafluoroethylene.

7. The composition of claim 1 wherein said gum comprises a copolymer of vinylidene fluoride, tetrafluoroethylene, and propylene.

8. The composition of claim 1 wherein said fluorinated ether composition is present in an amount sufficient to cross-link said gum.

9. The composition of claim 1 further comprising an organo-onium compound of the formula:

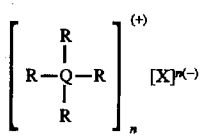

wherein:

Q is nitrogen, phosphorous, arsenic or antimony;

X is an organic or inorganic anion;

n is equal to the valence of the anion X; and each R is independently an alkyl, aryl, alkenyl, or combinations thereof, each R can be substituted with chlorine, fluorine, bromine, cyano, —OR' or —COOR' where R' is a $C_1$ to $C_{20}$ alkyl, aryl, aralkyl, or alkenyl, and any pair of the R groups can be connected with each other and with the Q atom to form a heterocyclic ring.

10. The composition of claim 9 wherein one or more of said R groups is of the formula CY$_2$COOR" where Y is a hydrogen or halogen atom or is a substituted or unsubstituted alkyl or aryl group having from 1 to about 6 carbon atoms and where R" is a hydrogen atom, a metal cation, an alkyl group, or is a group of the formula —COR'" where R'" is an alkyl group or is a group that itself contains organo-onium.

11. The composition of claim 1 wherein said fluorinated ether composition comprises difunctional fluoroaliphatic ether salts of the formula:

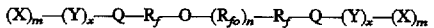

wherein:

each $R_f$ is, independently, a linear or branched perfluoroalkylene group of 1 to about 20 carbon atoms;

$R_{fo}$ comprises one or more linear or branched perfluoroxyalkylene ether groups wherein said groups may be random, block, or any combination thereof, each Q is, independently, a divalent linking group;

each Y is, independently, a divalent metal atom, or a monovalent metal atom;

each X is, independently, a halogen atom, a hydroxyl group, or is of the formula —OR" or —OOCR" where R" is a short-chain alkyl group having from 1 to about 4 carbon atoms;

n is a number from 0 to 30;

x is 0 or 1 with the proviso that when Q is terminated by an amino group, x is 0; and m is 0 or 1 with the proviso that when Y is a monovalent metal atom, m is 0;

when Y is a divalent metal atom, m is 1; and when x is 0, m is 0.

12. The composition of claim 11 wherein Q is selected from the group consisting of: —O—, —C₆H₃(R')O—, —CH₂CR₂O—, —CR₂O—, Z—N⁺H₃—C₆H₃(R')—, and Z—NH₃⁺—CH₂— where R is a hydrogen atom or is a fluorinated or non-fluorinated alkyl group having from 1 to about 2 carbon atoms, R' is a hydrogen or halogen atom or is a substituted or unsubstituted, cyclic or acyclic alkyl or aryl group having 1 to 10 carbon atoms that may optionally contain one or more catenary heteroatoms, and where Z is a anion.

13. The composition of claim 11 wherein $R_{fo}$ is —CF₂CF₂—O—.

14. The composition of claim 1 wherein said fluorinated ether composition comprises monofunctional fluoroaliphatic ether salts of the formula:

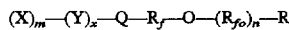

wherein:
each $R_f$ is, independently, a linear or branched perfluoroalkylene group of 1 to about 20 carbon atoms;

$R_{fo}$ comprises one or more linear or branched perfluoroalkylene ether groups wherein said groups may be random, block, or any combination thereof;

each Q is, independently, a divalent linking group;

each Y is, independently, a divalent metal atom, or a monovalent metal atom;

each X is, independently, a halogen atom, a hydroxyl group, or is of the formula —OR" or —OOCR" where R" is a short-chain alkyl group having from 1 to about 4 carbon atoms;

R is a monovalent, fluorinated or non-fluorinated alkyl group containing from 1 to about 10 carbon atoms or is a fluorinated or non-fluorinated allyl group containing from 2 to 10 carbon atoms n is a number from 0 to 30;

x is 0 or 1 with the proviso that when Q is terminated by an amino group, x is 0; and m is 0 or 1 with the proviso that when Y is a monovalent metal atom, m is 0;

when Y is a divalent metal atom, m is 1; and when x is 0, m is 0.

15. The composition of claim 14 wherein Q is selected from the group consisting of: —O—, —C₆H₃(R')O—, —CH₂CR₂O —,—CR₂O—, Z—N⁺H₃—C₆H₃(R')—, and Z—NH₃⁺—CH₂— where R is a hydrogen atom or is a fluorinated or non-fluorinated alkyl group having from 1 to about 2 carbon atoms, R' is a hydrogen or halogen atom or is a substituted or unsubstituted, cyclic or acyclic alkyl or aryl group having 1 to 10 carbon atoms that may optionally contain one or more catenary heteroatoms, and where Z is a anion.

16. The composition of claim 14 wherein $R_{fo}$ is —CF₂CF₂—O—.

17. The composition of claim 14 further comprising a curing system.

18. The composition of claim 17 wherein said curing system comprises a peroxide.

19. The composition of claim 17 wherein said curing system comprises a polyhydroxy compound.

20. A method of preparing an elastomer composition, comprising mixing a fluorocarbon elastomer gum and a fluorinated ether composition comprising a functional fluoroaliphatic ether salt that comprises a linear or branched perfluoroether structure each end of which is bonded to a terminal group wherein at least one of such terminal groups is an alkoxide metal salt or is an amino salt.

21. The method of claim 20 wherein said fluorinated ether composition comprises difunctional fluoroaliphatic ether salts of the formula:

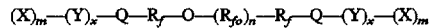

wherein:
each $R_f$ is, independently, a linear or branched perfluoroalkylene group of 1 to about 20 carbon atoms;

$R_{fo}$ comprises one or more linear or branched perfluoroxyalkylene ether groups wherein said groups may be random, block, or any combination thereof;

each Q is, independently, a divalent linking group;

each Y is, independently, a divalent metal atom, or a monovalent metal atom;

each X is, independently, a halogen atom, a hydroxyl group, or is of the formula —OR" or —OOCR" where R" is a short-chain alkyl group having from 1 to about 4 carbon atoms;

n is a number from 0 to 30;

x is 0 or 1 with the proviso that when Q is terminated by an amino group, x is 0; and m is 0 or 1 with the proviso that when Y is a monovalent metal atom, m is 0;

when Y is a divalent metal atom, m is 1; and when x is 0, m is 0.

22. The method of claim 20 wherein said fluorinated ether composition comprises monofunctional fluoroaliphatic ether salts of the formula:

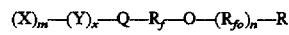

wherein:
each $R_f$ is, independently, a linear or branched perfluoroalkylene group of 1 to about 20 carbon atoms;

$R_{fo}$ comprises one or more linear or branched perfluoroalkylene ether groups wherein said groups may be random, block, or any combination thereof, each Q is, independently, a divalent linking group;

each Y is, independently, a divalent metal atom, or a monovalent metal atom;

each X is, independently, a halogen atom, a hydroxyl group, or is of the formula —OR" or —OOCR" where R" is a short-chain alkyl group having from 1 to about 4 carbon atoms;

R is a monovalent, fluorinated or non-fluorinated alkyl group containing from 1 to about 10 carbon atoms or is a fluorinated or non-fluorinated allyl group containing from 2 to 10 carbon atoms n is a number from 0 to 30;

x is 0 or 1 with the proviso that when Q is terminated by an amino group, x is 0; and m is 0 or 1 with the proviso that when Y is a monovalent metal atom, m is 0;

when Y is a divalent metal atom, m is 1; and when x is 0, m is 0.

23. A method of forming a cured elastomeric article, comprising 1) shaping a compounded elastomer composition, comprising a fluorocarbon elastomer gum and a fluorinated ether composition comprising a functional fluoroaliphatic ether salt that comprises a linear or branched perfluoroether structure each end of which is bonded to a terminal group wherein at least one of such terminal groups is an alkoxide metal salt or is an amino salt, at an elevated temperature into the form of an article, and 2) heating said formed article to cure said compounded composition.

24. A shaped article comprising the composition of claim 1 in its cured state.

* * * * *